United States Patent
Furuta (10) Patent No.: US 11,891,068 B2
(45) Date of Patent: Feb. 6, 2024

(54) METHOD OF CREATING DATABASE FOR PREVIEW VIBRATION DAMPING CONTROL FOR VEHICLE

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 17/466,324

(22) Filed: Sep. 3, 2021

(65) Prior Publication Data
US 2022/0118984 A1    Apr. 21, 2022

(30) Foreign Application Priority Data
Oct. 19, 2020    (JP) ................................. 2020-175308

(51) Int. Cl.
*B60W 40/13* (2012.01)
*B60W 40/068* (2012.01)

(52) U.S. Cl.
CPC .......... *B60W 40/068* (2013.01); *B60W 40/13* (2013.01); *B60W 2040/1307* (2013.01); *B60W 2552/20* (2020.02)

(58) Field of Classification Search
CPC .............. B60W 40/068; B60W 40/13; B60W 2552/20; B60W 2040/1307
See application file for complete search history.

(56) References Cited

U.S. PATENT DOCUMENTS

| | | | | |
|---|---|---|---|---|
| 5,979,885 A | * | 11/1999 | Katsuda | B60G 17/0165 267/140.14 |
| 2016/0356002 A1 | * | 12/2016 | Tani | E01C 23/01 |
| 2017/0122741 A1 | * | 5/2017 | Sakai | G05D 1/0276 |
| 2018/0003593 A1 | * | 1/2018 | Siegel | B60C 11/246 |
| 2018/0082492 A1 | * | 3/2018 | Stanek | G07C 5/0808 |
| 2018/0113055 A1 | * | 4/2018 | Kubota | B60G 17/018 |
| 2018/0154723 A1 | | 6/2018 | Anderson et al. | |
| 2018/0162186 A1 | | 6/2018 | Anderson et al. | |
| 2020/0103902 A1 | * | 4/2020 | Dominic | G01C 21/3822 |

* cited by examiner

*Primary Examiner* — Yazan A Soofi
*Assistant Examiner* — Naeem Taslim Alam
(74) *Attorney, Agent, or Firm* — Dinsmore & Shohl LLP (57) ABSTRACT

In a method of creating a database for preview vibration damping control, road surface displacement-associated information detected by a detection device is acquired, positional information capable of identifying a position where the road surface displacement-associated information is detected is acquired, a road surface displacement-associated value associated with a vertical displacement of a road surface is calculated based on the road surface displacement-associated information, and a set of data obtained by linking the road surface displacement-associated value and the positional information with each other is stored into a storage device as part of a database. When it is determined that the magnitude of the road surface displacement-associated value exceeds a permissible reference value set in advance, the magnitude of the road surface displacement-associated value is corrected in a reducing manner, prior to the step of storing the set of data into the storage device.

4 Claims, 4 Drawing Sheets

METHOD OF CREATING DATABASE FOR PREVIEW VIBRATION DAMPING CONTROL FOR VEHICLE

CROSS-REFERENCE TO RELATED APPLICATION

This application claims priority to Japanese Patent Application No. 2020-175308 filed on Oct. 19, 2020, incorporated herein by reference in its entirety.

BACKGROUND

1. Technical Field

The present disclosure relates to a method of creating a database for preview vibration damping control for a vehicle such as an automobile.

2. Description of Related Art

Preview vibration damping control is control for damping vibrations of a sprung mass by controlling a force applied between the sprung mass and an unsprung mass, based on road surface information such as a vertical displacement of a road surface in front of a vehicle with a view to compensating for a delay in control, namely, control for controlling a vibration damping force by reading the road surface information in advance. As a means for reading information in advance, it is known to structure a database by saving the road surface information in a cloud, and acquire the road surface information through communication from the database when the vehicle runs. An example of this kind of preview vibration damping control is described in, for example, US Patent Application Publication No. 2018/0162186, and the road surface information is acquired by an in-vehicle camera or a sensor such as a radar sensor.

SUMMARY

In preview vibration damping control, an estimated passage position of a wheel is identified, and a target control force for damping vibrations of a sprung mass is calculated based on road surface information on the estimated passage position read in advance through communication from a database. Furthermore, a control force that is generated by an actuator when the wheel passes the estimated passage position is controlled in such a manner as to become equal to the target control force. Therefore, in a situation where the vertical displacement of a road surface is very large, the target control force may exceed a maximum output of the actuator that generates the control force, and as a result, problems such as excessive energy consumption and thermal damage to the actuator and a control apparatus may be caused.

In view of the foregoing problems, it is a main task of the present disclosure to provide a method of creating a database for preview vibration damping control that has been improved such that the possibility of a target control force exceeding a maximum output of an actuator that generates a control force is lower than before even in a situation where the vertical displacement of a road surface is very large.

According to the present disclosure, there is provided a method of creating a database for preview vibration damping control for a vehicle. This method is designed to create a database (45) for preview vibration damping control for a vehicle, through the use of an in-vehicle control apparatus (102) equipped with a detection device (a vertical acceleration sensor 31 and a stroke sensor 32) that detects road surface displacement-associated information associated with a vertical displacement of a road surface at at least one of a position of a wheel (11) and a position in front of a vehicle (V1) during the running of the vehicle, and a database control apparatus (104) equipped with a storage device (44) that stores a database. The method includes a step (S3100) of acquiring the road surface displacement-associated information detected by the detection device, a step (S320) of acquiring positional information capable of identifying a position where the road surface displacement-associated information is detected, a step (S340) of calculating a road surface displacement-associated value ($z_1$) associated with the vertical displacement of the road surface, based on the road surface displacement-associated information, a step (S370) of storing a set of data obtained by linking the road surface displacement-associated value and the positional information with each other, into the storage device, as part of the database (45).

The method of creating the database further includes a step (S360) of correcting, in a reducing manner, a magnitude of the road surface displacement-associated value, prior to a step of storing the set of data into the storage device, when it is determined that the magnitude of the road surface displacement-associated value exceeds a permissible reference value set in advance (S350).

According to the foregoing configuration, the road surface displacement-associated information detected by the detection device is acquired, and the positional information capable of identifying the position where the road surface displacement-associated information is detected is acquired. Furthermore, the road surface displacement-associated value that is associated with the vertical displacement of the road surface is calculated based on the road surface displacement-associated information, and the set of data obtained by linking the road surface displacement-associated value and the positional information with each other is stored into the storage device as part of the database. Thus, the database is created.

In consequence, the road surface displacement-associated value is calculated based on the road surface displacement-associated information that is acquired when the vehicle runs, and the database can be created and updated as the set of data obtained by linking the road surface displacement-associated value and the positional information with each other.

Furthermore, according to the foregoing configuration, when it is determined that the magnitude of the road surface displacement-associated value exceeds the permissible reference value set in advance, the magnitude of the road surface displacement-associated value is corrected in a reducing manner prior to the step of storing the set of data into the storage device.

In consequence, when it is determined that the magnitude of the road surface displacement-associated value exceeds the permissible reference value set in advance, the magnitude of the road surface displacement-associated value can be corrected in a reducing manner before the set of data is stored into the storage device after calculation of the road surface displacement-associated value. Furthermore, the database can be created and updated as the set of data obtained by linking the road surface displacement-associated value having the magnitude corrected in a reducing manner and the positional information with each other. Accordingly, the possibility of the target control force exceeding the maximum output of the actuator through calculation of the target control force based on the road surface displacement-associated value having the excessively large magnitude can be reduced, and the possibility of problems such as excessive energy consumption and thermal damage to the active actuator and the control apparatuses being caused can be reduced.

Aspects of the Present Disclosure

In one of the aspects of the present disclosure, the road surface displacement-associated value may be subjected to high-pass filtering processing (S360 and S460), in the step of correcting, in a reducing manner, the magnitude of the road surface displacement-associated value ($z_1$) (S360).

According to the foregoing aspect, the magnitude of the road surface displacement-associated value is corrected in a reducing manner by subjecting the road surface displacement-associated value to high-pass filtering processing. In consequence, when it is determined that the magnitude of the road surface displacement-associated value exceeds the permissible reference value set in advance, the magnitude of the road surface displacement-associated value corrected in a reducing manner can be smoothly changed. Accordingly, the possibility of the magnitude of the road surface displacement-associated value corrected in a reducing manner becoming a constant value can be further reduced, and the controllability of preview vibration damping control can be further enhanced than in the case where, for example, the magnitude of the road surface displacement-associated value is limited to the permissible reference value.

In another one of the aspects of the present disclosure, a step of subjecting the road surface displacement-associated value to frequency processing such that frequencies lower than a predetermined frequency are removed in the step (S340 and S430) of calculating the road surface displacement-associated value ($z_1$) may be further included. An effect of removing frequencies higher and lower than the predetermined frequency by high-pass filtering processing may be more intense than the same effect of frequency processing.

According to the foregoing aspect, the road surface displacement-associated value is subjected to frequency processing such that frequencies lower than the predetermined frequency are removed in the step of calculating the road surface displacement-associated value. The effect of removing frequencies higher and lower than the predetermined frequency by high-pass filtering processing is more intense than the same effect of frequency processing. In consequence, frequencies higher and lower than the predetermined frequency can be effectively removed through high-pass filtering processing. Thus, the possibility of the road surface displacement-associated value used to calculate the target control force becoming excessively large can be effectively reduced.

Furthermore, in still another one of the aspects of the present disclosure, a step (S330) of linking the road surface displacement-associated information detected by the detection device and the positional information with each other, and transmitting the road surface displacement-associated information and the positional information from the in-vehicle control apparatus (102) to the database control apparatus (104) may be further included. The road surface displacement-associated value ($z_1$) that is associated with the vertical displacement of the road surface is calculated based on the road surface displacement-associated information received by the database control apparatus, in the step (S340) of calculating the road surface displacement-associated value.

According to the foregoing aspect, the road surface displacement-associated information and the positional information are linked with each other, and are transmitted from the in-vehicle control apparatus to the database control apparatus, and the road surface displacement-associated value that is associated with the vertical displacement of the road surface is calculated based on the road surface displacement-associated information received by the database control apparatus. In consequence, the road surface displacement-associated value does not need to be calculated through online processing in the in-vehicle control apparatus, so the calculation load of the in-vehicle control apparatus can be reduced, and the storage capacity of the storage device of the in-vehicle control apparatus can be reduced. Furthermore, the road surface displacement-associated value may be calculated through offline processing in the database control apparatus. Therefore, filtering processing and integral calculation that are needed to calculate the road surface displacement-associated value can be performed through offline filtering processing and ideal integration respectively.

Furthermore, in still another one of the aspects of the present disclosure, a step (S440) of transmitting a set of data obtained by linking the road surface displacement-associated value and the positional information with each other from the in-vehicle control apparatus (102) to the database control apparatus (104) may be further included. The set of data received by the database control apparatus is stored into the storage device as part of the database (45), in the step (S470) of storing the set of data into the storage device (44).

According to the foregoing aspect, the set of data obtained by linking the road surface displacement-associated value and the positional information with each other is transmitted from the in-vehicle control apparatus to the database control apparatus, and the set of data received by the database control apparatus is stored into the storage device as part of the database. In consequence, the magnitude of the road surface displacement-associated value is reduced before the set of data is transmitted to the database control apparatus. Therefore, the possibility of the set of data including the road surface displacement-associated value having the excessively large magnitude being transmitted to the database control apparatus can be reduced.

In the foregoing description, names and/or reference symbols used in one of the embodiments that will be described later are attached, in parentheses, to the configuration of the present disclosure corresponding to the embodiment, with a view to helping understand the present disclosure. However, the respective components of the present disclosure are not limited to the components of the embodiment corresponding to the names and/or the reference symbols attached in parentheses. Other objects, features, and corresponding advantages of the present disclosure will be easily understood from the description of the embodiment of the present disclosure given below with reference to the drawings. Incidentally, in the foregoing description, the letters S and numerals in parentheses that are associated with steps denote step numbers in the embodiment.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiment (Configuration)

Figure 1:
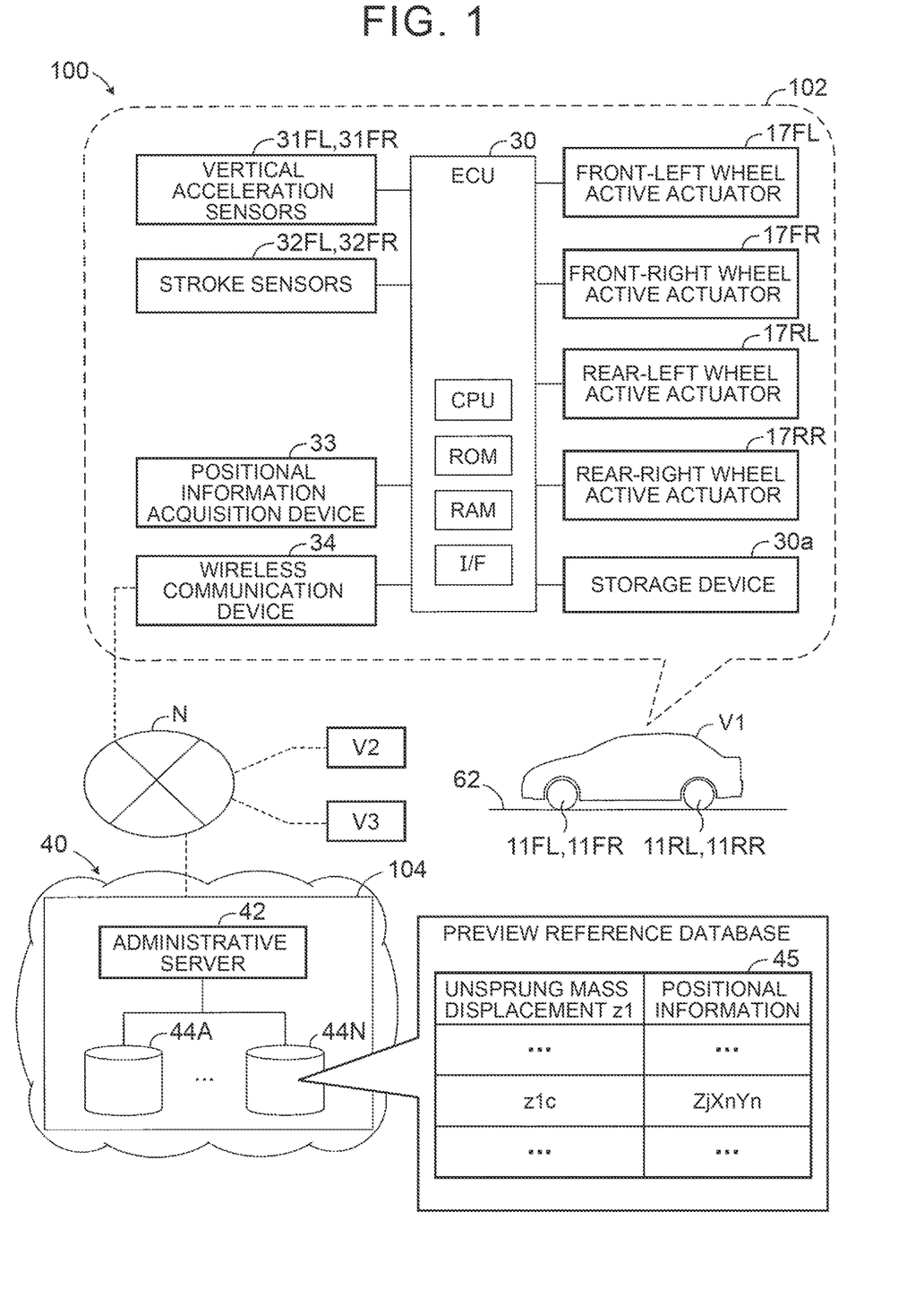
FIG. 1 is a schematic configuration view showing a preview vibration damping control apparatus that carries out a method of creating a database according to one of the embodiments of the present disclosure.

In the present embodiment, as shown in FIG. 1, a preview vibration damping control apparatus 100 includes an in-vehicle apparatus 102 mounted in a vehicle V1, and a preview reference database control apparatus 104 installed outside the vehicle.

The in-vehicle apparatus 102 includes an ECU 30 that functions as a first control unit, a storage device 30a, a positional information acquisition device 33, and a wireless communication device 34. Furthermore, the in-vehicle apparatus 102 includes active actuators 17FR, 17FL, 17RR, and 17RL provided in such a manner as to correspond to a front-right wheel 11FR, a front-left wheel 11FL, a rear-right wheel 11RR, and a rear-left wheel 11RL of the vehicle V1 respectively. The front-right wheel 11FR, the front-left wheel 11FL, the rear-right wheel RR, and the rear-left wheel RL are referred to as wheels 11 as needed. Each of the active actuators 17FR to 17RL functions as a braking force generation device configured to generate a braking force applied between a sprung mass and an unsprung mass. The active actuators 17FR to 17RL are referred to as active actuators 17 as needed.

Incidentally, each of the braking force generation devices may be an active stabilizer device, a variable damping force-type shock absorber, or the like, although the braking force that can be generated is limited. Furthermore, each of the braking force generation devices may be a suspension capable of generating a braking force, such as a suspension with a wheel including an in-wheel motor, namely, a suspension in which a longitudinal force of the wheel is converted into a vertical force through the use of the geometry of the suspension, an adaptive variable suspension system (AVS), or the like.

Figure 2:
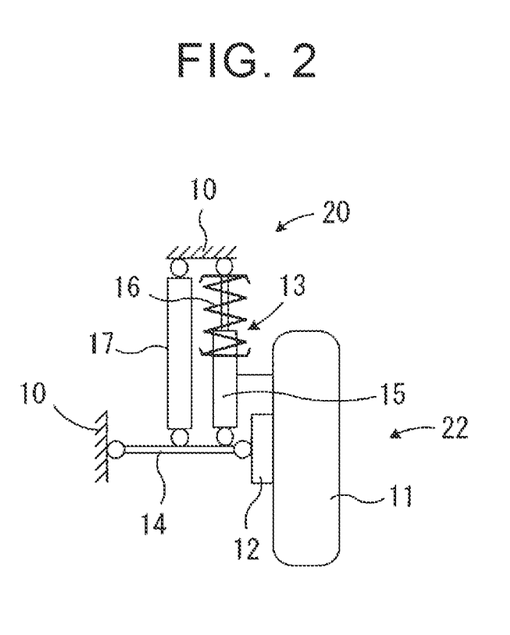
FIG. 2 is a view showing a suspension including an active actuator.

As shown in FIG. 2, each of the wheels 11 of the vehicle V1 is rotatably supported by a wheel support member 12. The vehicle V1 is equipped with suspensions 13 corresponding to the wheels 11 respectively. Each of the suspensions 13 may be an independent-type suspension. Each of the suspensions 13 suspends a corresponding one of the wheels from a vehicle body 10, and includes a suspension arm 14, a shock absorber 15, and a suspension spring 16.

The suspension arm 14 couples the wheel support member 12 to the vehicle body 10. Incidentally, although only the single suspension arm 14 is depicted for the single suspension 13 in FIG. 2, the single suspension 13 may be provided with a plurality of suspension arms 14.

In FIG. 2, the shock absorber 15 and the suspension spring 16 are disposed between the vehicle body 10 and the suspension arm 14, but may be disposed between the vehicle body 10 and the wheel support member 12. The suspension spring 16 may be a spring other than a coiled spring.

As is well known, as for the vehicle body 10 of the vehicle V1 and members such as the shock absorber 15, those located on the vehicle body 10 side with respect to the suspension spring 16 belong to a sprung mass 20. In contrast, as for the wheel 11 of the vehicle V1 and the members such as the shock absorber 15, those located on the wheel 11 side with respect to the suspension spring 16 belong to an unsprung mass 22.

Furthermore, the active actuator 17 is disposed between the vehicle body 10 and the suspension arm 14, in parallel with the shock absorber 15 and the suspension spring 16. The active actuator 17 is configured to generate a control force applied between the sprung mass 20 and the unsprung mass 22. The control force is controlled through the control of the active actuator 17 by the ECU 30.

The ECU 30 includes a microcomputer. The microcomputer includes a CPU, a ROM, a RAM, an interface (I/F), and the like. The CPU realizes various functions by executing instructions (programs and routines) stored in the ROM.

The ECU 30 is connected to a nonvolatile storage device 30a from which information can be read and into which information can be written. The ECU 30 can store (save) information into the storage device 30a, and retrieve the information stored (saved) in the storage device 30a. Incidentally, the storage device 30a is a hard disc drive in the present embodiment, but is not limited thereto. Any well-known storage device or storage medium from which information can be read and into which information can be written may be adopted as the storage device 30a.

The in-vehicle apparatus 102 is provided with vertical acceleration sensors 31FR and 31FL and stroke sensors 32FR and 32FL in the sprung mass in such a manner as to correspond to the front-right and front-left wheels 11FR and 11FL respectively. The vertical acceleration sensors and the stroke sensors are in-vehicle sensors, and are connected to the ECU 30. The vertical acceleration sensors and the stroke sensors function as detection devices that detect road surface displacement-associated information on vertical displacements of a road surface at positions of the front-right and front-left wheels respectively at intervals of a predetermined time during the running of the vehicle V1.

Incidentally, "the road surface displacement-associated information" may be at least one of an unsprung mass displacement representing a vertical displacement of the unsprung mass of the vehicle, an unsprung mass speed that is a time differential value of the unsprung mass displacement, a road surface displacement representing a vertical displacement of the road surface, a road surface displacement speed that is a time differential value of the road surface displacement, and a physical quantity that can form a basis of calculation of these values. Furthermore, "a road surface displacement-associated value" that will be described later may be one of an unsprung mass displacement representing a vertical displacement of the unsprung mass of the vehicle and a road surface displacement representing a vertical displacement of the road surface. In consequence, "the road surface displacement-associated information" and "the road surface displacement-associated value" are specifically pieces of information and values associated with irregularities, non-flatness, lateral inclination, longitudinal inclination, and the like of the road surface.

Each of the detection devices that detect the road surface displacement-associated information at the positions of the front-right and front-left wheels may be a vertical acceleration sensor that detects a vertical acceleration of the unsprung mass 22. Furthermore, a preview sensor that detects a vertical displacement of the road surface at a position in front of the vehicle, such as a laser sensor, a camera sensor, a LIDAR, or a radar sensor that detects a vertical displacement of the road surface may be adopted as a detection device that detects road surface displacement-associated information at the position in front of the vehicle.

The vertical acceleration sensors 31FR and 31FL of the sprung mass 20 are provided in regions of the vehicle body 10 (the sprung mass) corresponding to the front-right and front-left wheels respectively. The vertical acceleration sensors 31FR and 31FL detect vertical accelerations (sprung mass accelerations $ddz_2fr$ and $ddz_2fl$) of the corresponding regions of the sprung mass 20 respectively, and output signals representing the vertical accelerations to the ECU 30. Incidentally, the vertical acceleration sensors 31FR and 31FL are referred to as "vertical acceleration sensors 31" in the case where there is no need to distinguish these sensors from each other. By the same token, the sprung mass accelerations $ddz_2fr$ and $ddz_2fl$ are referred to as "sprung mass accelerations $ddz_2$".

The stroke sensors 32FR and 32FL are provided on the front-right and front-left wheel suspensions 13 respectively. The stroke sensors 32FR and 32FL detect vertical strokes Hfr and Hfl of the suspensions 13 respectively, and output signals representing the vertical strokes to the ECU 30. The strokes Hfr and Hfl are relative vertical displacements between the vehicle body 10 (the sprung mass) and the wheel support member 12 (the unsprung mass) corresponding to the positions of the front-right and front-left wheels respectively. Incidentally, the stroke sensors 32FR and 32FL are referred to as "stroke sensors 32" in the case where there is no need to distinguish these sensors from each other. By the same token, the strokes Hfr and Hfl are referred to as "strokes H".

Furthermore, as shown in FIG. 1, the ECU 30 is connected to the positional information acquisition device 33 and the wireless communication device 34.

The positional information acquisition device 33 is equipped with a global navigation satellite system (GNSS) receiver and a map database. The GNSS receiver receives "a signal (e.g., a GNSS signal) from an artificial satellite" for detecting a position (a current position) of the vehicle V1 at a current timing. Road map information and the like are stored in the map database. The positional information acquisition device 33 is a device that acquires the current position (e.g., a latitude and a longitude) of the vehicle V1 based on the GNSS signal, for example, a navigation device.

The wireless communication device 34 is a wireless communication terminal for communicating with the preview reference database control apparatus 104 accommodated in a cloud 40 via a network N. As shown in FIG. 1, other vehicles V2 and V3 also have in-vehicle devices similar to the in-vehicle apparatus 102 of the vehicle V1, and wireless communication devices of the vehicles V2 and V3 can also communicate with the preview reference database control apparatus 104 via the network N. Incidentally, in the present embodiment shown in FIG. 1, the two vehicles V2 and V3 are depicted in addition to the vehicle V1. However, there may be a greater number of vehicles, for example, three or more vehicles in addition to the vehicle V1.

The control apparatus 104 is equipped with an administrative server 42 and a plurality of storage devices 44A to 44N that are connected to the network. The administrative server 42 functions as a second control unit. One or more of the storage devices 44A to 44N is or are referred to as "the storage device 44" or "the storage devices 44" in the case where there is no need to distinguish these storage devices from one another. The storage devices 44 function as storage devices of the preview vibration damping control apparatus 100 outside the vehicle.

The administrative server 42 may be an ECU equipped with a CPU, a ROM, a RAM, an interface (I/F), and the like. The administrative server 42 searches for and retrieves the data stored in the storage devices 44, and writes data into the storage devices 44.

Preview reference databases (hereinafter referred to simply as "databases") 45 that are maps for preview vibration damping control are stored in the storage devices 44 respectively. In each of the databases 45, an unsprung mass displacement $z_1$ calculated based on the road surface displacement-associated information detected during the actual running of the vehicle V1, V2, or V3 is registered while being linked with positional information capable of identifying a position where the road surface displacement-associated information is detected. In consequence, each of the databases 45 is a combination of data on the unsprung mass displacement $z_1$ calculated based on the road surface displacement-associated information and the positional information capable of identifying the position where the road surface displacement-associated information is detected. The calculation of the unsprung mass displacement $z_1$ and the positional information will be described later in detail.

In the present embodiment, the administrative server 42 stores information on respective roads, and stores road surface block information in which a road surface of each of the roads is divided in advance into a plurality of road surface blocks, as map information indicating road surface areas of the respective roads in the databases 45. An X-direction may be, for example, a northern direction, and a Y-direction may be a direction perpendicular to the X-direction. Positions of each of the road surface blocks in the X-direction and the Y-direction are expressed by indices Xm (m=1, 2, 3 . . . ) and indices Yn (n=1, 2, 3 . . . ) respectively.

Incidentally, the size and shape of each of the road surface blocks may be determined in accordance with the size, shape, and ease of control of an area where a tire of each wheel is grounded. For example, each of the road surface blocks is a square having four sides each being as long as a certain value of 50 mm to 150 mm (typically 100 mm).

In the present embodiment, the positional information stored into each of the storage devices 44 by the administrative server 42 is positional information capable of identifying a road surface block. The positional information registered in each of the databases 45 and linked with, for example, an unsprung mass displacement $z_1c$ is expressed as "ZjXmYn" identifying a road surface block (Zj is an identification number for each of the roads, and j is a positive integer), as shown in FIG. 1.

Furthermore, the ECU 30 is connected to the front-right wheel active actuator 17FR, the front-left wheel active actuator 17FL, the rear-right wheel active actuator 17RR, and the rear-left wheel active actuator 17RL via drive circuits (not shown) respectively.

The ECU 30 calculates a target control force Fct for reducing vibrations of the sprung mass of each of the wheels 11 based on the unsprung mass displacement $z_1$ of a later-described estimated passage position where each of the wheels 11 is estimated to pass, and controls a corresponding one of the active actuators 17 such that a control force Fc generated by the active actuator 17 becomes equal to the target control force Fct when the wheel 11 passes the estimated passage position.

For example, the target control force Fct is expressed by an equation (1) shown below, where $z_1$ denotes the unsprung mass displacement, namely, the vertical displacement of the unsprung mass and $dz_1$ denotes the time differential value of $z_1$. Incidentally, a gain $\beta_1$ in the equation (1) is a value determined by a damping coefficient (an equivalent damping coefficient) of a damper (the shock absorber 15 or the like) of the suspension 13. A gain $\beta_2$ is a value determined by a spring constant (an equivalent spring constant) of a spring (the suspension spring 16 or the like) of the suspension 13.

$$Fct = \beta_1 \times dz_1 + \beta_2 \times z_1 \quad (1)$$

In consequence, the ECU 30 of the in-vehicle apparatus 102 acquires in advance (reads in advance) the unsprung mass displacement $z_1$ of the position where each of the wheels 11 later passes (the estimated passage position), through communication from the database control apparatus 104, and calculates the target control force Fct by applying the unsprung mass displacement $z_1$ and the differential value $dz_1$ thereof to the equation (1). Then, the ECU 30 causes the actuator 17 to generate the control force Fc corresponding to the target control force Fct at a timing when the wheel 11 passes the estimated passage position (i.e., at a timing when the unsprung mass displacement $z_1$ applied to the equation (1) is produced). In this manner, the vibrations of the sprung mass that are produced when the wheel 11 passes the estimated passage position can be reduced. The foregoing is preview vibration damping control in the present embodiment.

Incidentally, in the foregoing description, the mass of the unsprung mass and elastic deformation of the tire are ignored, and a road surface displacement $z_0$ and the unsprung mass displacement $z_1$ are assumed to be equal to each other. Accordingly, similar preview vibration damping control may be performed using the road surface displacement $z_0$ instead of the unsprung mass displacement $z_1$.

An equation (2) shown below is an equation in which a differential term ($\beta_1 \times dz_1$) in the equation (1) is omitted to more simply calculate the target control force Fct. Even in the case where the target control force Fct is calculated according to the equation (2), a control force ($=\beta_2 \times z_1$) for reducing the vibrations of the sprung mass is generated by the actuator 17. Therefore, the vibrations of the sprung mass can be further reduced than in the case where this control force is not generated.

$$Fct = \beta_2 \times z_1 \quad (2)$$

(Database Creation Routine)

Figure 3:
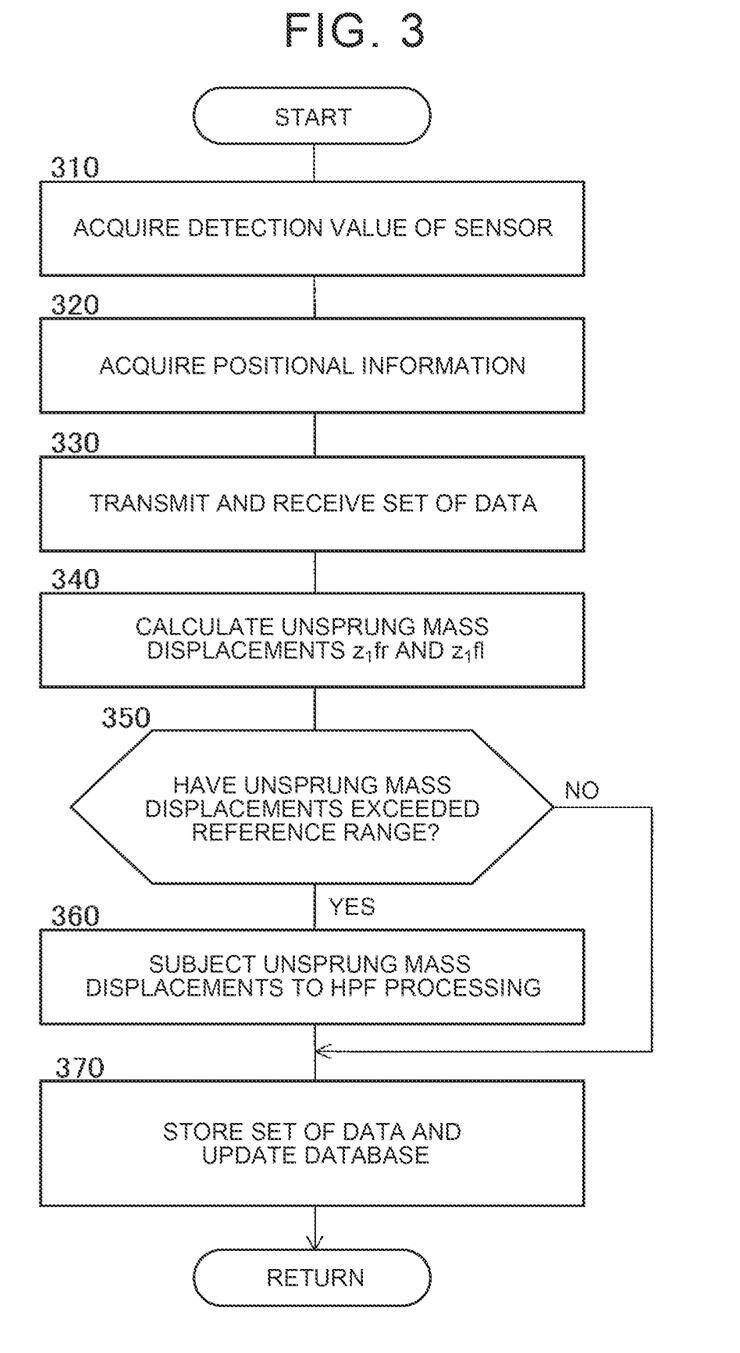
FIG. 3 is a flowchart showing a preview reference database creation routine of the embodiment.

In the present embodiment, each of the databases 45 is created through the execution of a database creation routine shown in a flowchart of FIG. 3 at intervals of a predetermined elapsed time. Incidentally, steps 310 to 330 are carried out by the CPU of the ECU 30, and steps 330 to 370 are carried out by the CPU of the administrative server 42. Each of steps 310 to 370 may be carried out as to values associated with the front-right wheel and values associated with the front-left wheel. Steps 310 to 370 may be carried out as to the values associated with the front-left wheel, and then steps 310 to 370 may be carried out as to the values associated with the front-right wheel.

First of all, in step 310, the CPU acquires the sprung mass accelerations $ddz_2fr$ and $ddz_2fl$ detected by the vertical acceleration sensors 31FR and 31FL respectively, and the strokes Hfr and Hfl detected by the stroke sensors 32FR and 32FL respectively. These pieces of information are road surface displacement-associated information associated with vertical displacements of the road surface at the positions of the front-right wheel and the front-left wheel.

In step 320, the CPU acquires a current position and a traveling direction based on a running route of the vehicle V1 from the positional information acquisition device 33. In this case, the positional information acquisition device 33 identifies the current position and the traveling direction based on information on automated driving, information on GNSS, and the like. Various existing methods may be adopted to identify the current position and the traveling direction, so the detailed description of identification of the current position and the traveling direction will be omitted. The current position and the traveling direction of the vehicle V1 are positional information capable of identifying a position where the road surface displacement-associated information is acquired.

In step 330, the CPU of the ECU 30 transmits the information acquired in steps 310 and 320 to the administrative server 42 via the wireless communication device 34 and the network N, as a set of data obtained by linking the road surface displacement-associated information and the positional information capable of identifying the position where the road surface displacement-associated information is acquired with each other. The CPU of the administrative server 42 stores the received information into a storage device that is not shown in FIG. 1.

Incidentally, the information may be transmitted every time steps 310 and 320 are completed. However, the information acquired in steps 310 and 320 may be temporarily stored into the storage device 30a or the like, and a series of pieces of temporarily stored information may be transmitted to the administrative server 42 at intervals of a predetermined time.

In step 340, the CPU calculates unsprung mass displacements $z_1fr$ and $z_1fl$ corresponding to the front-right and front-left wheels, based on the sprung mass accelerations $ddz_2fr$ and $ddz_2fl$ and strokes Hfr and Hfl received in step 330 respectively, through offline data processing. The unsprung mass displacements may be calculated in any manner known in the relevant technical field. For example, each of the unsprung mass displacements may be calculated as a difference between a second-order integral value of the unsprung mass displacement and a corresponding one of the strokes, through the use of, for example, offline bandpass filtering processing or high-pass filtering processing (referred to as "frequency processing" in the present application) and ideal integration. Incidentally, the unsprung mass displacement $z_1$ is calculated as to each of the road surface blocks. In the case where the sprung mass accelerations or the like are detected at intervals greater than the size of the road surface blocks, complementary calculation is performed as needed.

Figure 4:
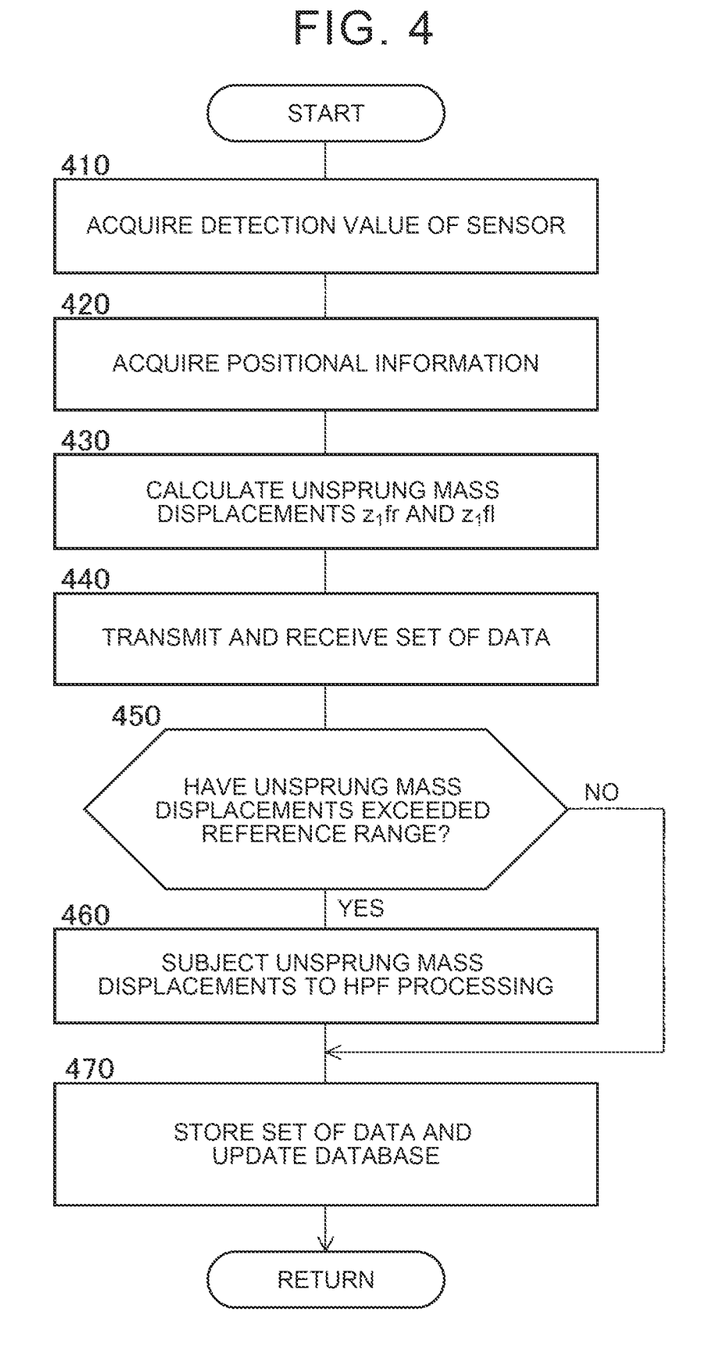
FIG. 4 is a flowchart showing a preview reference database creation routine of a modification example.

The unsprung mass displacements $z_1$ may be calculated by subjecting the vertical accelerations of the unsprung masses detected by the unsprung vertical acceleration sensors provided in such a manner as to correspond to the front-right and front-left wheels respectively to second-order integration respectively. Besides, each of the unsprung mass displacements $z_1$ may be calculated based on at least the vertical acceleration of the sprung mass, the suspension stroke, or the vertical acceleration of the unsprung mass at the position of a corresponding one of the wheels, through the use of an observer known in the relevant technical field. Furthermore, each of the unsprung mass displacements $z_1$ may be calculated based on a vertical displacement of a road surface at a position in front of the vehicle detected by a preview sensor. Incidentally, the same is true with step 430 in a later-described modification example as well.

In step 350, the CPU determines whether or not the absolute value of each of the unsprung mass displacements $z_1$ has exceeded a permissible reference value $z_1$ref (a positive constant) set in advance, namely, whether or not each of the unsprung mass displacements $z_1$ has exceeded a reference range $-z_1$ref to $z_1$ref. The permissible reference value $z_1$ref is determined in advance based on a vertically movable range at the time when each of the common active actuators 17 generates the control force Fc.

Incidentally, each of the actuators 17 controls the vibration damping force to be applied to a corresponding one of the wheels, by generating a control force inside the wheel 11 with respect to the vehicle. Therefore, the reference range is determined by a vertically movable range/a wheel rate of the wheel 11 controlled by the active actuator 17. Besides, the permissible reference value $z_1$ref may be determined based on a vertically movable range of an active actuator with the highest capability of generating a control force, among various vehicles in which preview vibration damping control is performed. Furthermore, in the case where the vehicle is equipped with an active stabilizer as well as the active actuator, the permissible reference value $z_1$ref differs depending on whether the control force generated by this active actuator and this active stabilizer is applied upward or downward. Therefore, the lower-limit and upper-limit of the reference range may be set as values that are different in magnitude from each other.

If the result of the determination in step 350 is positive, the CPU subjects each of the unsprung mass displacements $z_1$ to high-pass filtering processing (hereinafter referred to as "HPF processing") such that the absolute value of the unsprung mass displacement $z_1$ becomes equal to or smaller than the permissible reference value $z_1$ref to the maximum extent possible. That is, the CPU corrects, in a reducing manner, the magnitude of the unsprung mass displacement $z_1$ such that the unsprung mass displacement $z_1$ falls within the reference range $-z_1$ref to $z_1$ref to the maximum extent possible.

Incidentally, in the case where offline bandpass filtering processing is performed in step 340, the cutoff frequency of HPF processing is set higher than the lower-limit cutoff frequency of bandpass filtering processing. Besides, in the case where HPF processing is performed instead of bandpass filtering processing, the cutoff frequency of HPF processing in step 360 is set higher than the cutoff frequency of HPF processing in step 340, and the effect of HPF processing is intensified. The intensification of the effect of HPF processing may be achieved by enhancing the order of HPF. In the case where a plurality of pieces of HPF processing with different cutoff frequencies or different orders are performed in parallel, the intensification of the effect of HPF processing may be achieved by changing the weights of the pieces of HPF processing. Furthermore, the degree to which the effect of HPF processing is intensified may be variably set in such a manner as to rise as the amount of excess in the absolute value of the unsprung mass displacement $z_1$ over the permissible reference value $z_1$ref increases.

Furthermore, in a vehicle in which preview vibration damping control is performed by reading in advance the unsprung mass displacement $z_1$ and the positional information in each of the databases 45, when it is determined that the magnitude of each of the unsprung mass displacements $z_1$ is excessively large, the magnitude of the unsprung mass displacement $z_1$ may be reduced. In the case where there is a vehicle in which the magnitude of the unsprung mass displacement $z_1$ is reduced in performing such preview vibration damping control, the permissible reference value $z_1$ref, the cutoff frequency of HPF processing, and the like may be determined, considering that the magnitude of the unsprung mass displacement $z_1$ is reduced in performing preview vibration damping control. Furthermore, a plurality of permissible reference values $z_1$ref and the like may be set depending on whether or not the magnitude of the unsprung mass displacement $z_1$ is reduced in performing preview vibration damping control and in accordance with the degree to which the magnitude of the unsprung mass displacement $z_1$ is reduced, and a plurality of databases may be created in accordance with the intensity of the effect of HPF processing. In this case, a database is selected when the unsprung mass displacement $z_1$ is read in advance, in accordance with the degree to which the magnitude of the unsprung mass displacement $z_1$ is reduced in performing preview vibration damping control.

In contrast, if the result of the determination in step 350 is negative, namely, if it is determined that the absolute value of each of the unsprung mass displacements $z_1$ is equal to or smaller than the reference value $z_1$ref and the unsprung mass displacement is within the reference range, the CPU advances the control of creating a database to step 370 without carrying out step 360.

In step 370, the CPU identifies a road surface block corresponding to the position where the road surface displacement-associated information is acquired based on the positional information received in step 330. Furthermore, the CPU stores a set of data obtained by linking the identified road surface block and the unsprung mass displacement calculated in step 340 or the unsprung mass displacement subjected to HPF processing in step 360 with each other, into each of the storage devices 44, as part of a corresponding one of the databases (maps) 45.

Modification Example

In the present modification example, the creation of a database is carried out through the execution of a database creation routine shown in a flowchart of FIG. 4 at intervals of a predetermined elapsed time. Steps 410 to 440 are carried out by the CPU of the ECU 30, and steps 440 to 470 are carried out by the CPU of the administrative server 42.

As is understood from a comparison between FIGS. 3 and 4, steps 410 and 420 are carried out in the same manner as steps 310 and 320 respectively, and steps 450 to 470 are carried out in the same manner as steps 350 to 370 respectively. Accordingly, the description of these steps will be omitted.

In step 430, the CPU calculates the unsprung mass displacements $z_1$fr and $z_1$fl corresponding to the front-right and front-left wheels respectively through online data processing, based on the sprung mass accelerations $ddz_2$fr and $ddz_2$fl and strokes Hfr and Hfl acquired in step 410 respectively. The unsprung mass displacements may be calculated in any manner known in the relevant technical field. For example, each of the unsprung mass displacements may be calculated as a difference between a second-order integral value of the unsprung mass displacement and a corresponding one of the strokes, through the use of, for example, online bandpass filtering processing or high-pass filtering processing, namely, frequency processing and integration. Incidentally, in this step as well, the unsprung mass displacements $z_1$ are calculated as to each of the road surface blocks. In the case where the sprung mass accelerations or the like are detected at intervals greater than the size of the road surface blocks, complementary calculation is performed as needed.

In step 440, the CPU identifies a road surface block corresponding to the position where the road surface displacement-associated information is acquired, based on the positional information acquired in step 40. Furthermore, the CPU transmits a set of data obtained by linking the identified road surface block and the unsprung mass displacements calculated in step 430 with each other to the administrative server 42 via the wireless communication device 34 and the network N. The CPU of the administrative server 42 stores the received set of data into a storage device that is not shown in FIG. 1.

If the result of the determination in step 450 is negative, the CPU advances the control of creating a database to step 470 without carrying out step 460. In contrast, if the result of the determination in step 450 is positive, the CPU subjects each of the unsprung mass displacements $z_1$ to HPF processing such that the absolute value of the unsprung mass displacement $z_1$ becomes equal to or smaller than the reference value $z_1$ref in step 460. That is, the CPU corrects, in a reducing manner, the magnitude of each of the unsprung mass displacements $z_1$ such that the unsprung mass displacement $z_1$ falls within the reference range $-z_1$ref to $z_1$ref.

Incidentally, in the case where online bandpass filtering processing is performed in step 430, the cutoff frequency of HPF processing is set higher than the lower-limit frequency of bandpass filtering processing in step 460. Besides, in the case where HPF processing is performed instead of bandpass filtering processing, the cutoff frequency of HPF processing in step 460 is set higher than the cutoff frequency of HPF processing in step 430, and HPF processing is intensified. The intensification of HPF processing may be achieved by enhancing the order of HPF. In the case where a plurality of pieces of HPF processing with different cutoff frequencies or different orders are performed in parallel, the intensification of HPF processing may be achieved by changing the weights of the pieces of HPF processing. Furthermore, the degree to which the effect of HPF processing is intensified may be variably set in such a manner as to rise as the amount of excess in the absolute value of each of the unsprung mass displacements $z_1$ over the permissible reference value $z_1$ref increases.

According to the foregoing embodiment and the foregoing modification example, each of the unsprung mass displacements $z_1$ as the road surface displacement-associated value is calculated based on the road surface displacement-associated information that is acquired when the vehicle runs, and each of the databases 45 as a set of data obtained by linking the unsprung mass displacement $z_1$ and the positional information with each other can be created and updated.

Besides, according to the foregoing embodiment and the foregoing modification example, when it is determined that the magnitude of each of the unsprung mass displacements $z_1$ has exceeded the permissible reference value set in advance, the magnitude of the unsprung mass displacement $z_1$ can be corrected in a reducing manner, before the set of data is stored into a corresponding one of the storage devices 44 after calculation of the unsprung mass displacement $z_1$. Furthermore, each of the databases 45 can be created and updated as a set of data obtained by linking the unsprung mass displacement $z_1$ having the magnitude corrected in a reducing manner and the positional information with each other. Accordingly, the possibility of the target control force Fct exceeding the maximum output of each of the active actuators 17 through calculation of the target control force Fct based on the unsprung mass displacement $z_1$ having an excessively large magnitude can be reduced, and the possibility of problems such as excessive energy consumption and thermal damage to the active actuators and the control apparatuses being caused can be reduced.

Besides, according to the foregoing embodiment and the foregoing modification example, the magnitude of each of the unsprung mass displacements $z_1$ is corrected in a reducing manner by subjecting the unsprung mass displacement $z_1$ to HPF processing. In consequence, when it is determined that the magnitude of the unsprung mass displacement $z_1$ exceeds the permissible reference value $z_1$ref set in advance, the magnitude of the unsprung mass displacement $z_1$ corrected in a reducing manner can be smoothly changed. Accordingly, the possibility of the magnitude of the unsprung mass displacement $z_1$ corrected in a reducing manner becoming a constant value can be further reduced than in the case where, for example, the magnitude of the unsprung mass displacement $z_1$ is limited to the permissible reference value. As a result, the controllability of preview vibration damping control can be enhanced.

Furthermore, according to the foregoing embodiment and the foregoing modification example, when each of the unsprung mass displacements $z_1$ is subjected to frequency processing such that frequencies lower than the predetermined frequency are removed in calculating the unsprung mass displacement $z_1$, the effect of removing frequencies higher and lower than the predetermined frequency by HPF processing is more intense than the same effect of frequency processing. In consequence, frequencies higher and lower than the predetermined frequency can be effectively removed through HPF processing. Thus, the possibility of the unsprung mass displacement $z_1$ used to calculate the target control force becoming excessively large can be effectively reduced.

In particular, according to the foregoing embodiment, the road surface displacement-associated information and the positional information are linked with each other, and are transmitted from the in-vehicle control apparatus 102 to the database control apparatus 104. Each of the unsprung mass displacements $z_1$ is calculated based on the road surface displacement-associated information received by the database control apparatus. In consequence, there is no need to calculate the unsprung mass displacement $z_1$ through online processing in the in-vehicle control apparatus 102. Therefore, the calculation load of the in-vehicle control apparatus can be reduced, and the storage capacity of the storage device in the in-vehicle control apparatus can be reduced. Furthermore, the unsprung mass displacement $z_1$ may be calculated through offline processing in the database control apparatus 104. Therefore, filtering processing and integral calculation that are needed to calculate the unsprung mass displacement $z_1$ can be performed through offline filtering processing and ideal integration respectively.

Furthermore, according to the foregoing modification example, each of the unsprung mass displacements $z_1$ is calculated based on the road surface displacement-associated information in the in-vehicle control apparatus 102, and the set of data obtained by linking the unsprung mass displacement $z_1$ and the positional information with each other is transmitted from the in-vehicle control apparatus 102 to the database control apparatus 104. Furthermore, the set of data received by the database control apparatus is stored into each of the storage devices 44 as part of a corresponding one of the databases 45. In consequence, the magnitude of the unsprung mass displacement $z_1$ is reduced before the set of data is transmitted to the database control apparatus. Therefore, the possibility of the set of data including the unsprung mass displacement $z_1$ having an excessively large magnitude being transmitted to the database control apparatus can be reduced.

While the present disclosure has been described above in detail as to the specific embodiment thereof, it would be obvious to those skilled in the art that the present disclosure is not limited to the foregoing embodiment, and that various other embodiments are possible within the scope of the present disclosure.

For example, in the foregoing embodiment and the foregoing modification example, the magnitude of the road surface displacement-associated value is corrected in a reducing manner through HPF processing. However, the correction of the magnitude of the road surface displacement-associated value in a reducing manner may be achieved by, for example, limiting the magnitude of the road surface displacement-associated value to the permissible reference value.

Furthermore, in the foregoing embodiment and the foregoing modification example, the road surface displacement-associated value based on the road surface displacement-associated information is the unsprung mass displacement, but may be the road surface displacement.

Furthermore, in the foregoing embodiment and the foregoing modification example, the latter half of the database creation routine is executed by the administrative server 42 of the database control apparatus 104 installed outside the vehicle. However, at least part of the latter half of the database creation routine may be executed on an edge side, namely, in the vehicle. Each of the databases 45 does not need to be stored in a corresponding one of the storage devices 44 in the cloud 40, but may be stored in the storage device 30*a*.

Furthermore, in the foregoing embodiment and the foregoing modification example, information on a vehicle speed Vv1 is not transmitted from the in-vehicle apparatus 102 to the database control apparatus 104. However, the vehicle speed Vv1 may be acquired based on a current position of the vehicle V1 acquired by, for example, the GNSS receiver, and the information on the vehicle speed Vv1 may be transmitted from the in-vehicle apparatus 102 to the database control apparatus 104 as part of the set of data. Besides, in this case, the information on the vehicle speed Vv1 may be linked with the unsprung mass displacement and the positional information, and saved in each of the storage devices 44 as part of a corresponding one of the databases 45.

Furthermore, in the foregoing embodiment and the foregoing modification example, the CPU determines whether or not the absolute value of the unsprung mass displacement $z_1$ has exceeded the reference value $z_1$ref, namely, whether or not the unsprung mass displacement $z_1$ has exceeded the reference range $-z_1$ref to $z_1$ref, in steps 350 and 450 respectively. However, the determination in these steps may be replaced with a determination as to whether or not the maximum value of the absolute value of the unsprung mass displacement during a predetermined running time or within a predetermined running distance has exceeded a reference value.

What is claimed is:

1. A method of creating a database for preview vibration damping control for a vehicle, through use of an in-vehicle electronic control unit configured to detect road surface displacement-associated information associated with a vertical displacement of a road surface at at least one of a position of a wheel and a position in front of the vehicle during running of the vehicle, and a database electronic control unit configured to store the database, the method comprising:

determining a permissible reference value based on a vertically movable range at a time when active actuators generate a control force;

acquiring the detected road surface displacement-associated information;

acquiring positional information capable of identifying a position where the road surface displacement-associated information is detected;

calculating a road surface displacement-associated value associated with the vertical displacement of the road surface, based on the road surface displacement-associated information;

storing a set of data obtained by linking the road surface displacement-associated value and the positional information with each other as part of the database;

correcting, in a reducing manner, a magnitude of the road surface displacement-associated value, prior to the step of storing the set of data, when it is determined that the magnitude of the road surface displacement-associated value exceeds the permissible reference value set in advance; and calculating, based on the corrected magnitude of the road surface displacement-associated value, a target control force, wherein the in-vehicle electronic control unit causes the active actuators to generate the control force corresponding to the target control force, wherein the road surface displacement-associated value is subjected to high-pass filtering processing, in the step of correcting, in the reducing manner, the magnitude of the road surface displacement-associated value, the reducing manner performed by the high-pass filtering processing.

2. The method of creating the database for preview vibration damping control for the vehicle according to claim 1, further comprising:

subjecting the road surface displacement-associated value to frequency processing such that frequencies lower than a predetermined frequency are removed in the step of calculating the road surface displacement-associated value, wherein an effect of removing frequencies higher and lower than the predetermined frequency by the high-pass filtering processing is more intense than a same effect of the frequency processing.

3. The method of creating the database for preview vibration damping control for the vehicle according to claim 1, further comprising:

linking the detected road surface displacement-associated information and the positional information with each other, and transmitting the road surface displacement-associated information and the positional information from the in-vehicle electronic control unit to the database electronic control unit, wherein the road surface displacement-associated value associated with the vertical displacement of the road surface is calculated based on the road surface displacement-associated information received by the database electronic control unit, in the step of calculating the road surface displacement-associated value.

4. The method of creating the database for preview vibration damping control for the vehicle according to claim 1, further comprising:

transmitting the set of data obtained by linking the road surface displacement-associated value and the positional information with each other from the in-vehicle electronic control unit to the database electronic control unit, wherein
the set of data received by the database electronic control unit is stored as part of the database, in the step of storing the set of data.

* * * * *